Jan. 11, 1927.                W. O. HEUBLEIN                1,614,067
           AMPULLA FOR INJECTION LIQUIDS COMPRISING SEPARATED COMPARTMENTS
                              Filed March 12, 1925
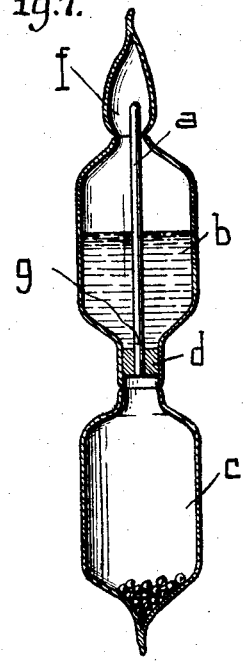
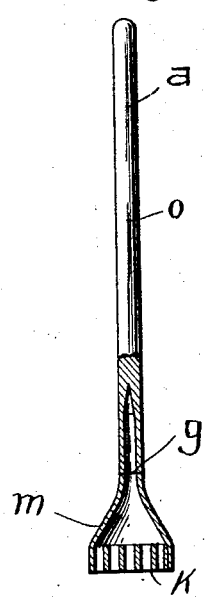
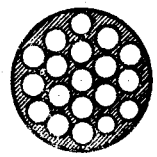

Patented Jan. 11, 1927.

1,614,067

UNITED STATES PATENT OFFICE.

WILHELM OSKAR HEUBLEIN, OF FRANKFORT-ON-THE-MAIN, GERMANY.

AMPULLA FOR INJECTION LIQUIDS COMPRISING SEPARATED COMPARTMENTS.

Application filed March 12, 1925, Serial No. 14,936, and in Germany January 29, 1925.

This invention relates to ampullæ for injection liquids having separated compartments. All these compartments may contain liquids or the one or other of the same may contain dry substances or gas. All substances have to be brought in contact with one another, for any reasons whatsoever, shortly before the injection, and with this object in view the partitions which separate the different compartments have to be destroyed.

It has become known to make provision that the partitions between the compartments can be broken in any convenient manner, for instance by means of a breaking lever mounted on the vaulted partition, or with the aid of a striking body designed to break the glass partition between two or more compartments.

It is advantageous to use glass for ampullæ of this type as glass is chemically inalterable in the widest limit and as it is easy to break glass owing to its brittleness. This property of the glass presents, however, the inconvenience that very thin glass splinters get into the injection liquid and are sucked in through the narrow bore of the needles where they are jammed and impede the use of the syringe.

According to the invention a filtering body is inserted over the compartment in which the gaseous, solid and liquid substances are to be mixed. To use other material but glass for making the filtering body would be inconvenient for the same reasons for which other material but glass must not be used for the ampullæ. Organic substances are liable to decompose and to combine with the gaseous, liquid or solid substances contained in the compartments.

According to the invention the filtering body is made by casting glass around hair-thin metal wires which, after cooling, are removed from the glass. The filter body may however be made from glass tubes united by glass, said glass tubes being stretched until the tubular spaces have become capillary.

A filter of this type can be made in the shape of a rod and molten on the lower surface of the tulip-shaped end of the breaking lever which forms at the same time the partition, or the lower end of a breaking lever may be made from such a filter. The use of glass as material for the filter body presents the advantage that glass combines readily with glass and that it does not produce any heat tensions difficult to overcome.

Two embodiments of the invention are shown, by way of example, on the accompanying drawing in which—

Fig. 1 shows in an ampulla a breaking lever with the rod shaped filter body.

Fig. 2 shows the breaking lever made from a rod shaped filter body.

Fig. 3 is a cross section through a filter body, on much enlarged scale.

The ampulla comprises an upper compartment $b$ and a lower compartment $c$ separated by a partition $d$ which has to be destroyed to make the two compartments communicate. With this object in view a breaking lever $a$ is arranged the upper end of which is imprisoned, in a manner known per se, in a narrowed part $f$ at the upper end of the ampulla. The breaking lever has an incision $g$ so that it can be easily broken off. The lower end of breaking lever $a$ possesses a cross section as shown in Fig. 3. The channels in the glass body can be produced either by casting the glass around thin metal wires which are removed after cooling, or by drawing out glass tubes around which glass has been cast. When the upper end of the breaking lever $a$ has been broken off in order to make the compartment $b$ communicate with the compartment $c$ the liquid from compartment $b$ must filter through the filter body shown in Fig. 3 before it can get into the compartment. The capillary channels in the filter body prevent glass splinters or other not dissolved or separated substances which might be prejudicial to the injection from passing into the compartment $c$.

The breaking lever shown in Fig. 2 consists of a tube closed at the top and having a tulip shaped lower end above which a thickening of the glass tube is arranged, having a circular incision in its outer circumference. This tulip-shaped bottom part is closed at the lower end by a filter body $k$ which is made in disk shape from a glass rod of the cross section shown in Fig. 3. By this filter body $k$ glass splinters from the breaking of the tulip-shaped bottom end $m$ of the glass tube $o$ are prevented from getting into the lower compartment $c$. To facilitate the flowing over of the liquid from the upper compartment $b$ into the lower compartment $c$ it is necessary to either produce a vacuum in the lower compartment c or a pressure above the atmospheric in the upper compartment b if this compartment is not to be opened. In most cases a vacuum in the lower compartment c will be sufficient.

I claim:—

1. An ampulla for injection liquids having two compartments, a breakable partition separating said two compartments, a breaking lever on said partition for breaking the same, and a filter body under said partition designed to retain glass splinters from the broken partition.

2. An ampulla for injection liquids having two campartments, a breakable partition separating said two compartments, a breaking lever on said partition for breaking the same, and a filter body under said partition designed to retain glass splinters from the broken partition, said filter body of glass having been obtained by casting molten glass around thin metal wires and removing said wires after cooling so that capillary channels are produced in the glass body.

3. An ampulla for injection liquids having two compartments, a breaking lever in said upper compartment, a tulip-shaped lower end of said breaking lever molten into the ampulla to form the partition between said two compartments, a rod shaped filter body of glass having capillary channels fixed by melting under said tulip-shaped bottom part of the breaking lever.

In testimony whereof I affix my signature.

WILHELM OSKAR HEUBLEIN.